UNITED STATES PATENT OFFICE.

HAYDN M. BAKER, OF BROOKLYN, NEW YORK.

DISINFECTANT.

SPECIFICATION forming part of Letters Patent No. 430,725, dated June 24, 1890.

Application filed February 24, 1890. Serial No. 341,462. (Specimens.)

*To all whom it may concern:*

Be it known that I, HAYDN M. BAKER, of Brooklyn, Kings county, in the State of New York, have invented a new and useful Product for Deodorizing and Disinfecting Purposes, of which the following is a specification.

The product in which my invention consists is what I believe to be a new double salt obtained by the combination of alkaline permanganates and silicates.

The product can readily be obtained by mixing pulverized or crystallized potassium, sodium, or other soluble permanganate with a solution of sodium or potassium silicate of the density found in commerce, whereupon a change occurs by the permanganate passing into solution, and subsequently combining with the dehydrated silicate and assuming a definite chemical constitution of modern stability. In carrying out this process it is only important to select the so-called "silicate of soda" or "silicate of potash," as found in aqueous solution in commerce, and then to mix it with the requisite proportion of the permanganate—potassium permanganate, for example—by a stirring operation until the whole of the mixture coagulates into a thick magma, which may then be pressed into molds of suitable sizes and shapes and afterward dumped and dried, artificial heat being used to hasten the latter operation, if desired. The product will then be ready for commercial distribution and use as a deodorizer and disinfectant.

In mentioning the commercial silicate of soda as the article used for combination with the soluble permanganates, I am aware that the said commercial silicate of soda is a mixture of monosilicate, disilicate, and trisilicate with more or less aluminate of soda, according to the method of its preparation. Such variations as these, which occur in commercial solutions of soluble silicates, render it impracticable to designate specific proportions to be used in connection with the permanganates; but the mere act of gradually adding the permanganates to the solution while stirring or mixing will enable an operator endowed with ordinary judgment and skill to regulate the quantity, because the reaction that occurs during this operation clearly indicates the proportion required.

The main advantage which accrues from the use of permanganates in a combination of this character is the restrained solubility of the product when placed, for example, in running water, thereby diffusing the action of a given weight of permanganate through a greater length of time, and affording the opportunity of extensive contact throughout the time of action upon infected materials.

In conclusion, I desire to state that I do not pretend to be the discoverer of the deodorizing and disinfecting powers of the soluble permanganates, because their properties for such purposes have been a matter of scientific knowledge for a long time; but

What I claim as new and of my own invention is—

The herein-described slowly-dissolving double salt, resulting from the combination of alkaline permanganates and silicates, substantially as hereinbefore set forth.

In testimony whereof I have hereunto set my hand this 21st day of February, A. D. 1890.

HAYDN M. BAKER.

Witnesses:
H. F. BAUER,
WM. G. SHAW.